Patented Oct. 7, 1941

2,258,500

UNITED STATES PATENT OFFICE 2,258,500

TREATMENT OF OXIDIZED HYDROCARBONS TO SEPARATE THE ACIDIC CONTENT

Andreas Mertens, Dusseldorf-Benrath, and Willy Lange and Ludwig Mannes, Dusseldorf, Germany, assignors, by mesne assignments, to The Procter & Gamble Company, Cincinnati, Ohio, a corporation of Ohio No Drawing. Application February 24, 1937, Serial No. 127,564. In Germany March 2, 1936

3 Claims. (Cl. 260—452)

This invention relates to the treatment of oxidation products of aliphatic hydrocarbons for the purpose of separating the more valuable acidic content from the remaining constituents which ordinarily are composed of unsaponifiable substances and unoxidized hydrocarbons.

It is well known that when higher molecular aliphatic hydrocarbons are subjected to oxidation processes, a heterogeneous mixture of oxidation products is obtained consisting for the most part of aliphatic acids, alcohols, esters, lactones and the like, with unoxidized hydrocarbons. The primary purpose of this invention is to separate from these reaction masses the more valuable "acidic content," that is, the whole acid content whether it be present in the free acid state or in a saponifiable state as in the esters.

Many processes have heretofore been proposed for treating oxidation products of higher molecular aliphatic hydrocarbons for the separation of unsaponifiable material. All of these processes have been unavoidably difficult to operate satisfactorily and up to the present time, the result has not been accomplished upon a commercial scale. Various workers have suggested that the non-oxidized portion of the oxidation products be separated by means of extraction or distillation, but these processes have proven uneconomical.

Broadly considered, the present invention may be defined as involving the process steps which comprise converting the acidic content of oxidation products of aliphatic hydrocarbons into salts and evaporating off the volatile constituents, that is, the unsaponifiable portion, water and other impurities by atomizing the reaction mass or otherwise greatly increasing the surface and heating the same until the salts are obtained in dried form.

In accordance with the simplest embodiment of the present invention, the oxidation products of higher molecular aliphatic hydrocarbons are treated with an alkali under conditions which split the saponifiable constituents and form salts of all the acids present, the resulting reaction solution being thereafter reduced to small particles by atomizing and then distilled to separate the unsaponifiable material and other liquids by the application of heat, which distillation may be aided by subatmospheric pressure in the heating chamber.

A preferred embodiment of the present invention involves the conversion of the fatty acid content into salts by the action of sodium hydroxide, salting out the resulting salts from an aqueous solution of the same by adding water and a salt such as sodium chloride, settling and decanting to separate a large portion of the unsaponifiable matter and atomizing the remaining partially purified solution with or without the addition of further water into a heated zone whereby the remaining unsaponifiable matter and other volatile materials are distilled off and the salts of the aliphatic acids are obtained in a dried form.

The present invention is particularly applicable to oxidation products of mixtures of hydrocarbons obtained in the synthetic production of benzine. In the treatment of these materials, it is frequently desirable to eliminate the lower molecular hydrocarbon content and their oxidation products from the saponifiable or acid portion of the oxidation products. In this case, which constitutes yet another embodiment of the present invention, the oxidation products containing the mixtures of low molecular and high molecular hydrocarbons are subjected to a treatment with water either alone or containing sulfuric acid, thereby dissolving the substances of low molecular weight, which substances are thereafter separated from the desirable constituents in any suitable manner. Thereupon, the oxidation products of the higher molecular hydrocarbons are treated with an alkali to form salts, atomized and heated to evaporate off the unsaponifiable materials and other volatile substances.

In accordance with yet another embodiment, the formation of the salts from the oxidation products of the higher molecular aliphatic hydrocarbons is divided into two steps; the first involving a hydrolyzing action brought about by the use of water under pressure or steam in conventional manner and the second involving neutralizing the acid content with sodium hydroxide or other alkali to form the salts. The aqueous mass containing the salts is freed from the unsaponifiable constituents by any of the methods herein described.

The processes of the present invention are in general applicable to the treatment of all oxidation products of higher aliphatic hydrocarbons whether they be natural mixtures or mixtures produced by synthesis. Suitable natural mixtures may be those existing in the oxidation products of solid paraffins and as well liquid paraffins, such as soft paraffin, hard paraffin or other paraffinic fractions. Oxidation products of synthetic paraffin mixtures are also suitable as raw materials, such mixtures being obtainable in benzine syntheses processes.

The instant process has proven particularly suitable for the treatment of oxidation products obtainable from the liquid-solid mixtures of higher aliphatic hydrocarbons obtained in the production of synthetic benzines in accordance with the processes of Fr. Fischer (see Brennstoffchemie, 1928, page 21, as well as 1932, page 461 et seq.).

The instant invention is independent of the method by which the oxidation products of the higher molecular alcohols are obtained, so long as the oxidation product contains a mixture of saponifiable and unsaponifiable substances. The oxidation may be carried out, for example, through the action of oxygen, oxygen-containing gases, such as air or compounds yielding oxygen under the conditions of use, such as ozone, nitric oxides, nitric acid and chromic acid. The oxidation may be assisted, if so desired, by the action of catalysts such as the heavy metals and their salts, for example, manganese, nickel, cobalt, copper, iron, chromium, or lead and vanadium as well as in the presence or absence of alkalis, alkaline earths or their salts. These metal catalysts may be employed in the form of soaps of saturated or unsaturated fatty acids, naphthenic acids or resinic acids in which condition they are particularly suitable for the reason that they form a colloidal mixture when dissolved in the hydrocarbons.

The conversion of the free acids and the saponifiable portion of the oxidation products into salts may be carried out in accordance with the present invention in any suitable manner according to known processes. Although any number of suitable salts are satisfactory, the alkali salts such as the sodium salts are preferred. In the saponification and neutralization step wherein the organic salts are produced, the alkali may be contained in solution or in solid form, or as an alkali carbonate. The alkaline material may be brought into intimate contact with the oxidation products by kneading or mixing the same together, preferably with the addition of heat. Through this action, a thorough saponification, or splitting, of the esters and the like is obtained. The saponification, if so desired, may be aided by the application of pressure, in which case the saponification will be carried out in a stirring autoclave.

The reaction mass containing the salts of the aliphatic acids whether treated preliminarily or not to separate a portion of the unsaponifiable material is treated to distill off the unsaponifiable materials and other volatile matter present by atomizing or finely dividing the liquid mass into small particles to form a mist with or without the aid of pressure or vacuum, and heating the sprayed particles to a temperature which evaporates off the volatiles present leaving the salts in the form of a pourable dry powder.

In the distillation treatment, any suitable type of atomizing drier may be employed. The reaction mass containing the salts and the unsaponified oxidation products may be forced into the drying zone or chamber in streams, thin films, drops or in the form of the finest spray possible. In obtaining this fine degree of subdivision, any suitable type of apparatus may be employed such as that containing nozzle deflecting walls, revolving disks, centrifuges, jets of steam, compressed gas or the like. The present invention includes distillation processes wherein carrier gases or vapors, such as superheated steam, carbon dioxide, hydrogen and nitrogen, are employed to increase the surface or ease of atomization of the reaction mass, which carrier gases or vapors, if desired, may be superheated. The atomization may be accomplished with the aid of air but such procedure is not recommended for under certain circumstances, explosive mixtures may be formed.

The distillation process, wherein a carrier gas is employed may be carried out in such manner that the carrier gases either wholly or in part are recirculated through the drying apparatus, in which case the gases are freed from the volatile constituents in the cycle and reheated, if desired, before they are again reintroduced into the drying chamber.

The residue obtained by the distillation as above described is composed of the salts of the aliphatic acids and usually is in a dry, pourable, pulverized form. If it is desired to obtain the free fatty acids, such may be accomplished very readily by treating the salts with mineral salts in conventional manner. The fatty acids obtainable, if so desired, are readily usable or suitable for the preparation of soaps, especially when they have been vacuum distilled to remove additional impurities.

The unsaponifiable material which has been distilled off and cooled may be added to the oxidation product to be treated again in accordance with the present invention. The efficiency of the process as a whole may in some instances be increased by this expedient.

*Example*

An oxidation product is procured by oxidizing a liquid-solid portion of a synthetic benzine obtained in accordance with the teachings of Fr. Fischer, said oxidation product having an acid number of 61.9, a saponification number of 146.2 and a content of unsaponifiable material constituting 59.7%. This oxidation product, composed of mixtures of hydrocarbons in various degrees of oxidation is treated with sodium hydroxide solution of 38° Bé. strength at a temperature of 75–100° C. until saponification and neutralization of the acidic content occurs.

The reaction mass obtained in this manner is then diluted with water to an extent represented by 1000 parts by weight of water to each 2000 parts by weight of the raw material used. Part of the unsaponifiable material present is then separated by adding about 2% sodium chloride, settling at a temperature of from 50–70° C. and then decanting. Through this procedure 71% of the unsaponifiable material is removed. The resulting aqueous solution of the salts of the acidic portion contains from about 16–17% of said salts and sometimes a lesser percentage of the unsaponifiable material. This solution is atomized at a temperature of 180° C. with the aid of superheated steam. The unsaponifiable material and other volatiles are evaporated off, leaving the salts of the aliphatic acids in the form of a yellow, pourable, dry powder containing at the most a small percentage of unsaponifiable material.

In a modification of the foregoing process, the lower molecular oxidation products are separated out through treatment with dilute sulfuric acid. By this treatment 81% of the unsaponifiable material is separated before the distillation step is effected.

It should be understood that the present invention is not limited to the specific procedure herein disclosed but that it extends to all equivalent steps, substances and conditions which will occur to these skilled in the art.

We claim:

1. The process of separating out the commercially important acidic content of oxidation products of aliphatic hydrocarbons in a substantially purified form comprising subjecting said oxidation products to the action of an alkali whereby neutralization and saponification of the acidic content is effected, separating a portion of the unsaponified matter by adding salt to an aqueous solution of the saponified and neutralized materials, decanting to separate off the solubilized aliphatic acid salts and atomizing the solution in a heated zone and heating at a temperature and until water and other substances present are distilled off and substantially dried salts of aliphatic acids are obtained.

2. The process of separating out the acidic content of high molecular weight from oxidation products of aliphatic hydrocarbon mixtures of low and high molecular weight which comprises mixing water with said oxidation products thereby dissolving the substances of low molecular weight, separating the resulting solution, treating the remaining oxidation products of a high molecular weight with an alkali to form salts of the acidic content thereof, reducing the resulting mass in liquid form to small particles and heating said particles at a temperature at which and until the unsaponified impurities evaporate off and leave the salts of higher molecular aliphatic acids in substantially dry form.

3. The process of separating out the commercially important acidic content of oxidation products of aliphatic hydrocarbons in a substantially purified form comprising subjecting said oxidation products to the action of an alkali whereby neutralization and saponification of the acidic content is effected, separating a portion of the unsaponified matter by adding salt to an aqueous solution of the saponified and neutralized materials, decanting to separate off the solubilized aliphatic acid salts, atomizing the solution in a heated zone at an atomizing temperature not substantially in excess of 180° C. and heating in said zone until water and other substances present are distilled off and dried salts of aliphatic acids are obtained.

ANDREAS MERTENS.
WILLY LANGE.
LUDWIG MANNES.